(12) United States Patent
Bucht et al.

(10) Patent No.: US 11,370,438 B2
(45) Date of Patent: Jun. 28, 2022

(54) METHOD AND APPARATUS FOR CONTINUOUS CURVE SPEED ADJUSTMENT FOR A ROAD VEHICLE

(71) Applicant: ZENUITY AB, Gothenburg (SE)

(72) Inventors: Mattias Bucht, Lindome (SE); Tobias Karlsson, Gothenburg (SE)

(73) Assignee: ZENUITY AB, Gothenburg (SE)

( * ) Notice: Subject to any disclaimer, the term of this patent is extended or adjusted under 35 U.S.C. 154(b) by 258 days.

(21) Appl. No.: 16/670,442

(22) Filed: Oct. 31, 2019

(65) Prior Publication Data

US 2020/0139971 A1 May 7, 2020

(30) Foreign Application Priority Data

Nov. 1, 2018 (EP) .................. 18203942

(51) Int. Cl.
*B60W 30/18* (2012.01)
*B60W 40/072* (2012.01)
*G05D 1/02* (2020.01)

(52) U.S. Cl.
CPC ..... *B60W 30/18145* (2013.01); *B60W 40/072* (2013.01); *B60W 2420/42* (2013.01); *B60W 2420/52* (2013.01); *B60W 2520/10* (2013.01); *B60W 2520/14* (2013.01); *B60W 2540/10* (2013.01); *B60W 2540/12* (2013.01); *B60W 2540/14* (2013.01); *B60W 2552/05* (2020.02); *B60W 2552/15* (2020.02); *B60W 2552/20* (2020.02); *B60W 2552/30* (2020.02); *B60W 2555/20* (2020.02); *B60W 2720/10* (2013.01); *B60W 2720/106* (2013.01); *G05D 1/0223* (2013.01)

(58) Field of Classification Search
None
See application file for complete search history.

(56) References Cited

U.S. PATENT DOCUMENTS 10,144,399 B2 * 12/2018 Sugano ........... B60W 30/18145
2002/0173881 A1 11/2002 Lash et al.
2007/0150157 A1 6/2007 Lee et al.
(Continued)

FOREIGN PATENT DOCUMENTS

DE 102010054077 6/2012
EP 2527222 11/2012

*Primary Examiner* — Todd Melton
(74) *Attorney, Agent, or Firm* — Duane Morris LLP; Gregory M. Lefkowitz; Randall C. Pyles (57) ABSTRACT

A method of curve speed adjustment for a road vehicle includes obtaining data on: current ego velocity; distance and curvature of an upcoming road segment, represented by a set of control points to be negotiated; road property of a road comprising the road segment; environmental properties; and driver properties. The obtained data is continuously streamed to a data processing arrangement arranged to perform a translation to target velocities for the respective control points and, for each respective control point, a translation from target velocity for that control point and distance to that control point and obtained current ego velocity, to a target acceleration to reach that control point at its target velocity. The resulting target accelerations are continuously streamed to a control unit of the road vehicle to adjust the road vehicle acceleration to reach each respective control point at its target velocity.

10 Claims, 4 Drawing Sheets

(56) References Cited

U.S. PATENT DOCUMENTS

| | | |
|---|---|---|
| 2009/0037062 A1 | 2/2009 | Lee et al. |
| 2013/0332044 A1* | 12/2013 | Um .................. B60K 31/0066 701/93 |
| 2015/0151753 A1 | 6/2015 | Clarke et al. |
| 2015/0197225 A1 | 7/2015 | Raste et al. |

* cited by examiner

METHOD AND APPARATUS FOR CONTINUOUS CURVE SPEED ADJUSTMENT FOR A ROAD VEHICLE

CROSS-REFERENCE TO RELATED APPLICATIONS

This application claims priority to European Patent Application No. EP18203942.0, filed Nov. 1, 2018, the entire contents of which are incorporated herein by reference.

TECHNICAL FIELD

The present disclosure relates generally to curve speed adjustment for road vehicles and in particular a method of curve speed adjustment for a road vehicle as well as a road vehicle curve speed adjustment arrangement.

BACKGROUND

Driving at excessive speeds into a road curve could cause not only discomfort for vehicle occupants and safety issues due to potential loss of vehicle control, but also, excessive fuel consumption, possibly resulting in increased emissions.

Usually, a road vehicle driver relies on his or her visual information about the upcoming curve and possible speed limit and warning signs to determine the proper speed for negotiating that curve. However, the speed reduction required to negotiate a curve depends on many factors, such as the curvature of the road, the vehicle speed, the curve bank angle, the road gradient, the road surface coefficient of friction, vehicle characteristics, driver competence, etc.

In order to provide appropriate control of road vehicle speed for negotiating upcoming curves it has been suggested to either control against one point in the curve representing the steepest point and control against that with a fixed deceleration in a proactive manner, or to have a yaw-rate based curve speed adaptation in a reactive manner.

However, both the above approaches to provide appropriate control of road vehicle speed for negotiating upcoming curves suffer from drawbacks and will not provide a natural and comfortable ride to vehicle passengers. Thus, there is a need for improving control of road vehicle speed for negotiating upcoming curves.

One attempt at addressing this issue is presented by US2015151753 A1, which discloses systems and methods that use cameras to provide autonomous navigation features. The disclosed system may include at least one image capture device configured to acquire a plurality of images of an area in a vicinity of the vehicle; a data interface; and at least one processing device. The at least one processing device may be configured to: receive the plurality of images via the data interface; recognize a curve to be navigated based on map data (e.g., GPS data) and vehicle position information; determine an initial target velocity for the vehicle based on at least one characteristic of the curve as reflected in the map data; adjust a velocity of the vehicle to the initial target velocity; determine, based on the plurality of images, one or more observed characteristics of the curve; determine an updated target velocity based on the one or more observed characteristics of the curve; and adjust the velocity of the vehicle to the updated target velocity. The system may detect the lane width, the curve radius, a degree of curvature, a rate of change in curvature, a degree of banking, a length or arc length of the curve, and the like. The system may determine the initial target velocity based on the presence of traffic lights before, during, or after a curve, weather conditions (e.g., light rain, heavy rain, windy, clear, etc.), road conditions (e.g., paved road, unpaved road, potholes, etc.), posted speed limits, the presence of vehicles or pedestrians nearby, etc.

Another attempt at addressing this issue, e.g. such as described by US2009037062 A1, discloses a system and method for detecting a road curve as a vehicle approaches the curve, automatically providing road curvature information and controlling vehicle speed. The system uses a locating device and a map database to know the vehicle's position. Depending on the speed of the vehicle, the system generates a curvature profile for different curvature data points at or around the curve in front of the vehicle. The system then generates a desired speed profile for the curvature points. The desired speed profile and the actual vehicle speed are compared to determine whether the vehicle is traveling too fast for the target speed at each profile point. The acceleration computation can be enhanced by providing a driver cornering mode input that the vehicle operator can select based on how aggressively the driver wants the system to act to slow down the vehicle.

Yet one additional attempt at addressing this issue is presented by EP2527222 A2, which discloses a method that involves controlling speed of a road vehicle depending on control data and providing curve data as the control data and as nearest curve data describing a drive curve during control of the road vehicle. The curve data is determined from road course data of a navigation device, and environment data is determined by a foresighted environment sensor. Comfort curve rate is determined by the consideration of the curve data. The comfort curve rate is determined from maximum curvature of a curve at a defined location and a predefined comfort lateral acceleration.

SUMMARY

An object of the present invention is to provide an improved method of curve speed adjustment for a road vehicle and an improved road vehicle curve speed adjustment arrangement.

According to a first aspect there is provided a method of curve speed adjustment for a road vehicle, that comprises: obtaining current ego velocity data of the road vehicle; obtaining distance and curvature value data of an upcoming road segment represented by a set of control points to be negotiated by the road vehicle; obtaining road property data of a road comprising the road segment to be negotiated; obtaining environmental property data of the road vehicle environ; obtaining driver property data of the road vehicle driver; continuously streaming the obtained data to a data processing arrangement arranged to process the data; evaluating, by the data processing arrangement, the obtained data to perform a translation to target velocities for the respective control points; performing, by the data processing arrangement, for each respective control point a translation from target velocity for that control point and distance to that control point and obtained current ego velocity of the road vehicle, to a target acceleration to reach that control point at the target velocity for that control point; continuously streaming the resulting target accelerations for the respective control points to a control unit of the road vehicle; adjusting, by the control unit, the road vehicle acceleration to reach each respective control point at the target velocity for that control point.

Continuous streaming and processing of obtained data allows for smooth adaptation of curve speed to a current situation and enables responsive control thereof.

In a further embodiment the method further comprises obtaining said curvature value data from at least one of: a map system; an onboard camera system; one or more onboard yaw-rate sensors; one or more onboard radar sensors; one or more onboard lidar sensors.

In a yet further embodiment the method further comprises obtaining said road property data that include at least one of: road width; slope; inclination; lane width; road type; banking; and number of lanes.

In a still further embodiment the method further comprises obtaining said environmental property data including at least one of data on: sight distance; light conditions; road edge; lateral clearance distance; and weather conditions.

In an additional embodiment the method further comprises obtaining said driver property data including at least one of data on: individual preferences; and driving style.

In yet an additional embodiment the method further comprises determining curve exits through fusing, by the data processing arrangement, two or more of: map data from the map system; yaw-rate data from the one or more onboard yaw-rate sensors; data from one or more onboard camera sensors; data from one or more onboard radar sensors; data from one or more onboard lidar sensors.

In a still further embodiment the method further comprises detecting from the obtained data, by the data processing arrangement, composite curves and performing the translation to a target acceleration such that acceleration between such curves is inhibited.

In a yet further embodiment the method further comprises providing an override of functionality on per-curve basis by depressing at least one of an accelerator pedal, a brake pedal or a clutch pedal of the road vehicle.

In yet an additional embodiment the method further comprises selecting the target acceleration for a respective control point as a minimum acceleration required, from a previous control point, to reach that control point at the target velocity for that control point.

In a still further embodiment the method further comprises determining, when performing the translation from target velocity to target acceleration, a gain of the control unit for adjusting the road vehicle acceleration based on a difference between an ego velocity of the road vehicle at a curve entrance and a target velocity for a control point, such that an increase in velocity difference provides an increased delay of acceleration.

In yet one embodiment the method further comprises performing the translation to target velocities for the respective control points using one of a polynomial or table lookup function.

According to a second aspect there is provided a road vehicle curve speed adjustment arrangement that comprises: means for obtaining current ego velocity data of the road vehicle; means for obtaining distance and curvature value data of an upcoming road segment represented by a set of control points to be negotiated by the road vehicle; means for obtaining road property data of a road comprising the road segment to be negotiated; means for obtaining environmental property data of the road vehicle environ; means for obtaining driver property data of the road vehicle driver; means for continuously streaming the obtained data to a data processing arrangement arranged to process the data; the data processing arrangement being arranged to: evaluate the obtained data to perform a translation to target velocities for the respective control points; and to perform, for each respective control point, a translation from target velocity for that control point and distance to that control point and obtained current ego velocity of the road vehicle, to a target acceleration to reach that control point at the target velocity for that control point; the arrangement further comprising: means for continuously streaming the resulting target accelerations for the respective control points to a control unit of the road vehicle; the control unit being arranged to adjust the road vehicle acceleration to reach each respective control point at the target velocity for that control point.

The above embodiments have the beneficial effects of allowing road vehicle curve speed to smoothly adapt to a current situation in a responsive manner with a more natural control feel.

BRIEF DESCRIPTION OF DRAWINGS

In the following, embodiments herein will be described in greater detail by way of example only with reference to attached drawings, in which.

DESCRIPTION OF EMBODIMENTS

In the following will be described some example embodiments of a method of curve speed adjustment for a road vehicle 1 (also denominated as E) and a road vehicle 1 curve speed adjustment arrangement.

Basis for a curve speed calculation target in accordance with the method are distance $d_n$, $d_{n+1}$, et., and curvature value $r_n$, $r_{n+1}$, etc., data of an upcoming road segment represented by a set of control points $P_n$, $P_{n+1}$, etc., to be negotiated by the road vehicle 1 as will be elaborated further in the following.

The method of curve speed adjustment for a road vehicle 1, comprises obtaining current ego velocity $v_E$ data of the road vehicle 1 and obtaining distance d and curvature value r data of an upcoming road segment represented by a set of control points $P_n$, $P_{n+1}$, etc., to be negotiated by the road vehicle 1. Ego velocity $v_E$ data may be obtained from a vehicle speedometer, e.g. via a vehicle CAN-bus or similar. Distance d and curvature value r data may be obtained from one or more of: a map system 2, such as a satellite based global positioning system (GPS); an onboard camera system 3, such as a forward-facing front view camera; one or more onboard yaw-rate sensors 4, i.e. gyroscopic devices that measure the vehicle's angular velocity around its vertical axis; one or more onboard radar sensors 6; one or more onboard lidar 5 sensors. Map systems 2, such as GPS-systems provide long range data with low resolution. Onboard camera sensors 3 provide medium range data with medium resolution. Yaw-rate sensors 4 provide current state data, i.e. zero-range data with high resolution. Radar 6 provides medium to high resolution at multiple ranges and lidar 5 sensors provide high resolution at medium ranges.

The method further comprises obtaining road property data of a road comprising the road segment to be negotiated. Such road property data may include one or more of: road width; slope; road inclination; lane width; road type, e.g. highway, country road, city street, etc.; road banking; and number of lanes of the road. The road property data may be obtained using onboard camera systems 3, map systems 2, lidar systems 5, radar systems 6 and combinations of such systems, e.g. through sensor fusion.

Additionally, the method comprises obtaining environmental property data of the road vehicle 1 environ. Environmental property data to be obtained in accordance with the method may include at least one of data on: sight distance; light conditions; road edge; lateral clearance distance; and weather conditions, e.g. rain, fog, etc. Such environmental property data may be obtained from onboard vehicle sensors 7, 8 as well as from online weather services 9. The lateral clearance distance is the distance from the edge of the carriageway to the nearest fixed obstacle, such as a column, a pole, an abutment etc.

The method also comprises obtaining driver property data of the road vehicle 1 driver. Driver property data to be obtained may include at least one of data on: driver individual preferences, e.g. as manifested in driving profiles such as ECO-, dynamic-, comfort-, sport-driving profiles etc.; and driving style of a driver, e.g. over- and understeering, etc. ECO-tuning is usually similar to but "opposite" to a dynamic mode.

The method is based on the idea of continuously streaming the obtained data to a data processing arrangement 12 arranged to process the data. Streaming is the delivery of content in real-time, as events happen, i.e. transferring a continuous stream of data. Continuous streaming of the obtained data allows a vehicle speed control system 14 to smoothly adapt to a current situation, enabling a responsive system.

Furthermore, the method suggests evaluating, by the data processing arrangement 12, the obtained data to perform a translation to target velocities $v_{road, n}$, $v_{road, n+1}$, etc., for the respective control points $P_n$, $P_{n+1}$, etc., i.e. using a common translation function for all curvature related obtained data to produce a target speed $v_{road, n}$, $v_{road, n+1}$, etc.

Still further, the method suggests performing, by the data processing arrangement 12, for each respective control point $P_n$, $P_{n+1}$, etc. a translation from target velocity $v_{road}$, $v_{road, n+1}$, etc., for that control point $P_n$, $P_{n+1}$, etc. and distance $d_n$, $d_{n+1}$, etc., to that control point $P_n$, $P_{n+1}$, etc. and obtained current ego velocity $v_E$ of the road vehicle 1, to a target acceleration $a_n$, $a_{n+1}$, etc., to reach that control point $P_n$, $P_{n+1}$, etc. at the target velocity $v_{road}$, $v_{road, n+1}$, etc., for that control point $P_n$, $P_{n+1}$, etc.

According to the method the resulting target accelerations $a_n$, $a_{n+1}$, etc., for the respective control points $P_n$, $P_{n+1}$, etc. should be continuously streamed to a control unit 14 of the road vehicle 1 and the road vehicle acceleration adjusted by the control unit 14 to reach each respective control point $P_n$, $P_{n+1}$, etc. at the target velocity $v_{road}$, $v_{road, n+1}$, etc., for that control point $P_n$, $P_{n+1}$, etc.

Figure 5:
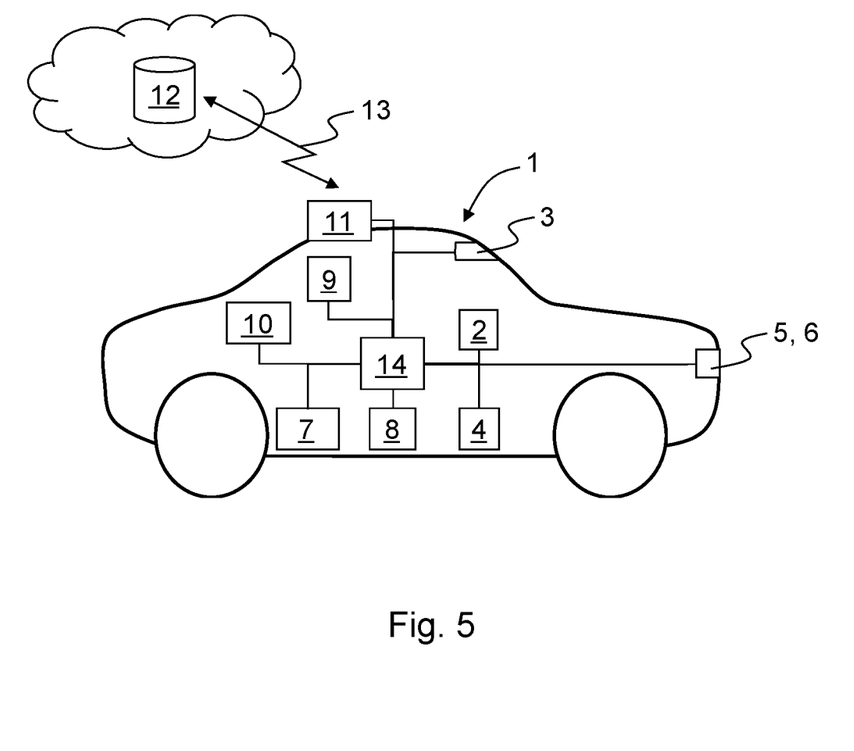
FIG. 5 illustrates schematically a road vehicle curve speed adjustment arrangement according to embodiments herein.

The data processing arrangement 12 may be arranged in the road vehicle 1 or at a location remote from the road vehicle 1, e.g. a remote server, as illustrated in FIG. 5.

A remote server may be one or more computer servers, each generally including at least one processor 12 and at least one memory (not shown), the memory storing instructions, e.g. software, executable by the processor 12, including instructions for carrying out various steps and processes described herein.

Streaming of the obtained data to a data processing arrangement 12 located at such a remote server, sometimes denominated cloud, and back to a control unit 14 of the road vehicle 1 may further include a communication network, e.g. as illustrated by arrow 13, connected to the remote server. Such a communication network 13 represents one or more mechanisms by which a road vehicle 1 may communicate with the remote server. Accordingly, the communication network 13 may be one or more of various wireless communication mechanisms, including any desired combination of wireless, e.g., radio frequency, cellular, satellite, and microwave communication mechanisms and any desired network topology. Exemplary communication networks include wireless communication networks, e.g., using Bluetooth, IEEE 802.11, LTE, 5G, etc.

Figure 1:
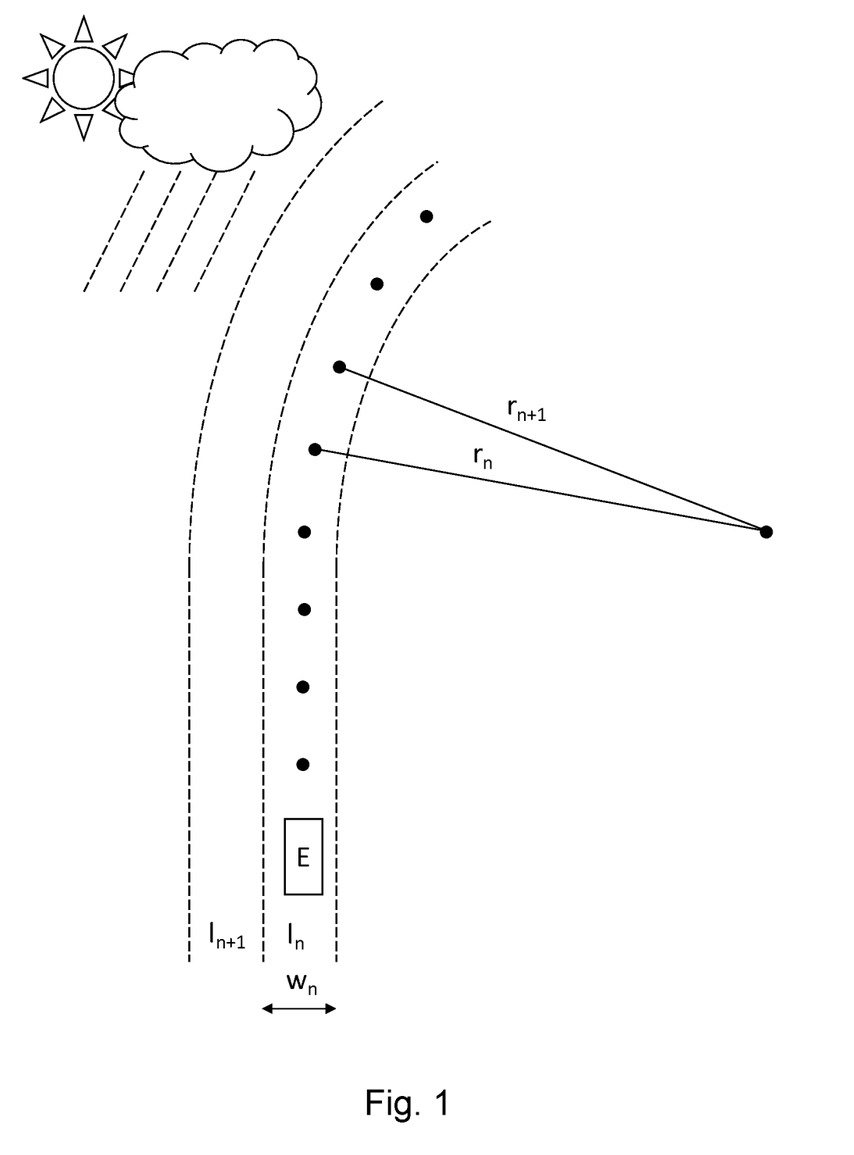
FIG. 1 illustrates schematically an ego vehicle approaching a curve to be negotiated.
Figure 2:
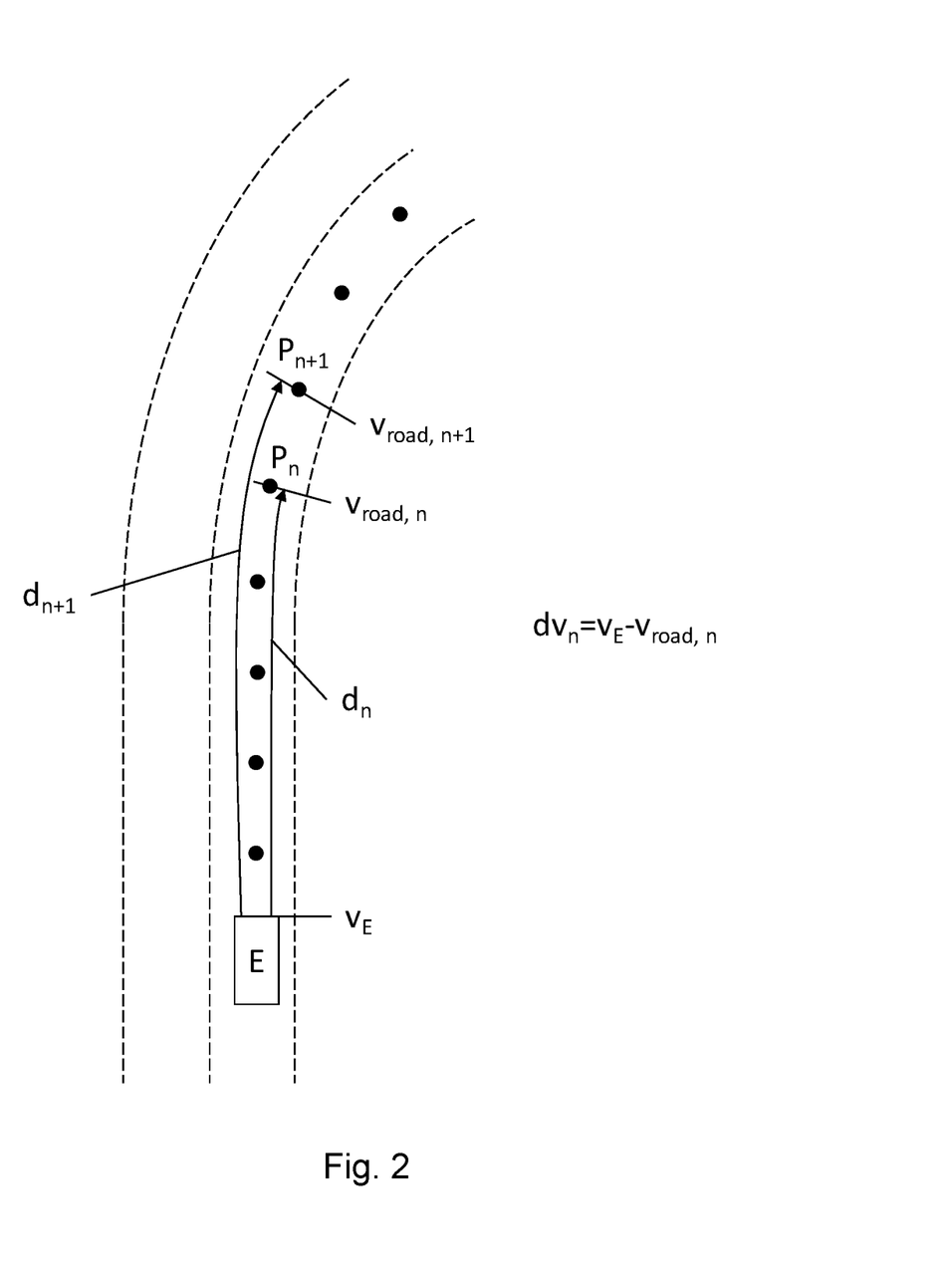
FIG. 2 illustrates schematically, together with FIG. 1, how a target speed for each point on a road curve is determined according to embodiments herein.

FIGS. 1 and 2 illustrates schematically how a target speed for each control point $P_n$, $P_{n+1}$, etc., on a road curve is determined by the curve radius from a map, the curve radius from the map compensated for the ego road vehicle E position in a lane, $r_n$, $r_{n+1}$ etc., the road type (highway, country road etc.), the number of lanes, $l_n$, $l_{n+1}$ etc., and lane width $w_n$, the road inclination, banking, weather conditions such as e.g. rain, and driver preferences. As illustrated in FIG. 2, acceleration of the ego road vehicle E for each control point $P_n$, $P_{n+1}$, etc., on the road curve, is determined by the distance d and the delta velocity dv, e.g. for control point $P_n$ the distance $d_n$ and the delta velocity $dv_n$. The delta velocity $dv_n$ is determined as $dv_n = v_E - v_{road, n}$ for control point $P_n$ and so on for subsequent control points $P_{n+1}$, etc. A controller gain may be determined, when performing the translation from target velocity $v_{road}$ to target acceleration a, a gain of the control unit 14 for adjusting the road vehicle 1 acceleration based on a difference between an ego velocity $v_{E, 0}$ of the road vehicle 1 at a curve entrance $P_0$ and a target velocity $v_{road, n}$ for a control point $P_n$, such that an increase in velocity difference $dv_n$ provides an increased delay of acceleration. The controller gain may also be influenced by driver preferences and optimized for low fuel consumption.

Figure 3:
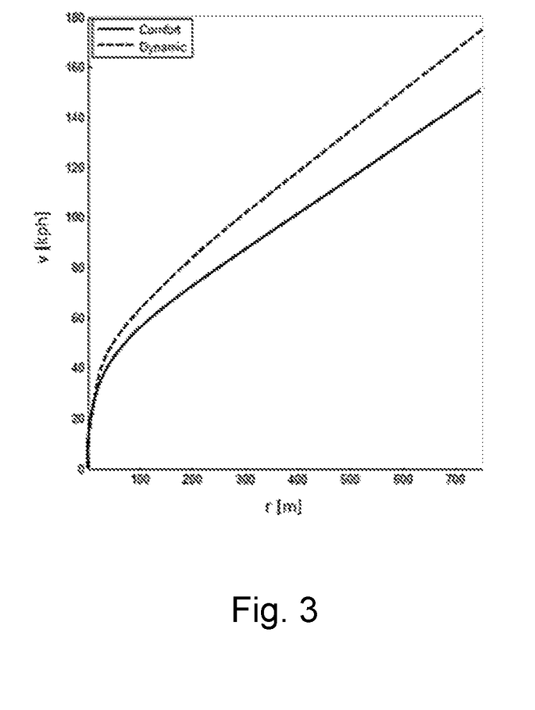
FIG. 3 illustrates schematically an example translation function from road curvature to target speed for small roads according to embodiments herein.

FIG. 3 illustrates schematically an example translation function from road curvature r to target speed v for small roads, taking some of the affecting factors, as described herein, into consideration. The full line illustrates a translation function tuned for comfort whereas the dashed line illustrates a translation function tuned for a dynamic driving profile.

Figure 4:
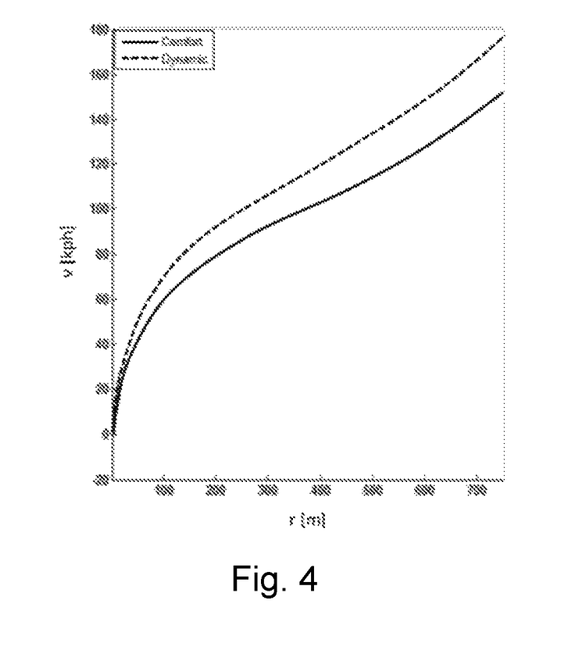
FIG. 4 illustrates schematically an example translation function from road curvature to target speed for large roads according to embodiments herein.

FIG. 4 illustrates schematically another example translation function from road curvature r to target speed v for large roads, taking some of the affecting factors, as described herein, into consideration. The full line illustrates a translation function tuned for comfort whereas the dashed line illustrates a translation function tuned for a dynamic driving profile.

Curve exits may be determined through fusing, by the data processing arrangement 12, two or more of: map data from the map system 2; yaw-rate data from the one or more onboard yaw-rate sensors 4; data from one or more onboard camera sensors 3; data from one or more onboard radar sensors 6; data from one or more onboard lidar sensors 5. This enables earlier acceleration at identified curve exits. Fusion of data, as above, is suggested in order to effectively eliminates errors due to positioning errors.

The method may further comprise detecting from the obtained data, e.g. map data, by the data processing arrangement 12, composite curves, sometimes also referred to as S-curves, and performing the translation to a target acceleration a such that acceleration between such curves is inhibited to maintain lower speed.

According to embodiments of the method may be provided an override of functionality on per-curve basis by depressing at least one of an accelerator pedal, a brake pedal or a clutch pedal (not shown) of the road vehicle 1. Pressing e.g. the accelerator pedal during speed reduction should then inhibit functionality for the rest of a current curve, or at least until the road vehicle 1 has reached a set speed, e.g. a set cruise-control speed.

It is also suggested, in accordance with embodiments of the method, to select the target acceleration $a_{n+1}$ for a respective control point $P_{n+1}$ as a minimum acceleration required, from a previous control point $P_n$, to reach that control point $P_{n+1}$ at the target velocity $v_{road,\ n+1}$ for that control point $P_{n+1}$. This provides for improved safety through smoother and more controlled curve speed adjustment.

Finally, the method may in embodiments thereof further comprise performing the translation from target velocity $v_{road}$ for a control point P and distance d to that control point P and obtained current ego velocity $v_E$ of the road vehicle 1, to a target acceleration a to reach that control point P at the target velocity $v_{road}$ for that control point P using one of a polynomial or table lookup function. Using a polynomial or table lookup function provides two alternative ways of performing this translation.

Thus, using the method allows for combination of all above mentioned factors to reduce fuel consumption when negotiating curves with a road vehicle 1 by ensuring smoother accelerations, holding curve speed longer in composite curves and earlier and lower deceleration requests.

A road vehicle 1 curve speed adjustment arrangement, as illustrated in FIG. 5, comprises: means 14 for obtaining current ego velocity $v_E$ data of the road vehicle 1; means 2, 3, 4, 5, 6 for obtaining distance $d_n$ and curvature $r_n$ value data of an upcoming road segment represented by a set of control points $P_n$, $P_{n+1}$, etc., to be negotiated by the road vehicle 1; means 2, 3, 5, 6 for obtaining road property data of a road comprising the road segment to be negotiated; means 3, 7, 8, 9 for obtaining environmental property data of the road vehicle 1 environ; means 10 for obtaining driver property data of the road vehicle 1 driver; means 11, 13 for continuously streaming the obtained data to a data processing arrangement 12 arranged to process the data; the data processing arrangement 12 being arranged to: evaluate the obtained data to perform a translation to target velocities v for the respective control points P; and to perform, for each respective control point P, a translation from target velocity $v_{road}$ for that control point P and distance d to that control point P and obtained current ego velocity $v_E$ of the road vehicle 1, to a target acceleration a to reach that control point P at the target velocity $v_{road}$ for that control point P; the arrangement further comprising: means 11, 13 for continuously streaming the resulting target accelerations a for the respective control points P to a control unit 14 of the road vehicle 1; the control unit 14 being arranged to adjust the road vehicle 1 acceleration to reach each respective control point P at the target velocity $v_{road}$ for that control point P.

The means for obtaining current ego velocity $v_E$ data of the road vehicle 1 may e.g. be part of the control unit 14 and arranged to obtain such data from a vehicle speedometer, e.g. via a vehicle CAN-bus or similar, or from a GPS system or similar.

The means for obtaining curvature value r data of an upcoming curve to be negotiated by the road vehicle 1 may comprise one or more of: a map system 2, such as a satellite based global positioning system (GPS); an onboard camera system 3, such as a forward-facing front view camera; one or more onboard yaw-rate sensors 4, one or more onboard radar sensors 6, and one or more onboard lidar sensors 5.

The means for obtaining road property data of a road comprising the road segment to be negotiated may comprise one or more of onboard camera systems 3, map systems 2, lidar systems 5, radar systems 6 and combinations of such systems, e.g. through sensor fusion, as well as other systems suitable for obtaining data on road properties, such as at least one of: road width; slope; inclination; lane width; road type; banking; and number of lanes.

The means for obtaining environmental property data of the road vehicle 1 environ, such as sight distance, light conditions, road edge, lateral clearance distance, and weather conditions, may comprise one or more of onboard vehicle sensors, e.g. camera sensors 3, temperature sensors 7, hygrometers 8 as well as communication equipment 9 for the wireless reception of environmental property data from online weather services.

The means for obtaining driver property data of the road vehicle 1 driver, such as individual preferences and driving style, may comprise one or more of human-machine-interfaces (not shown) for the selection of driving profiles such as ECO-, dynamic-, comfort-, sport-driving profiles etc., and onboard sensors 10 for determining a driving style of a driver, e.g. sensors for determining over- and under-steering, etc.

The means for continuously streaming the obtained data to a data processing arrangement 12 may comprise communication arrangements 11 for the transmission/reception (as illustrated by arrow 13) of wired, e.g. CAN-bus, or wireless, e.g. radio frequency, cellular, satellite, and microwave, communication with the data processing arrangement, further examples of which will be well known to the person skilled in the art.

The means for receiving to the control unit 14 of the road vehicle 1 the continuously streamed resulting target accelerations a may comprise communication arrangements 11 for the reception/transmission (as illustrated by arrow 13) of wired, e.g. CAN-bus, or wireless, e.g. radio frequency, cellular, satellite, and microwave, communication with the data processing arrangement 12, further examples of which will be well known to the person skilled in the art.

Combination of all above mentioned factors contribute to reduce fuel consumption by smoother accelerations, through holding curve speed longer in composite curves and through the provision of earlier and lower deceleration requests by a speed control unit of the road vehicle 1. The proposed method and arrangement also enable a modular design where additional factors can be added to a translation function from curvature r to target speed v without necessarily requiring a change in control strategy.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

The invention claimed is:

1. A method of continuous curve speed adjustment for a road vehicle, the method comprising:
   obtaining current ego velocity ($v_E$) data of the road vehicle;
   obtaining distance (d) and curvature value (r) data of an upcoming road segment represented by a set of control points ($P_n$, $P_{n+1}$, etc.) to be negotiated by the road vehicle;
   obtaining road property data of a road comprising the road segment to be negotiated;
   obtaining environmental property data of the road vehicle environ;
   obtaining driver property data of the road vehicle driver;
   continuously streaming the obtained data to a data processing arrangement arranged to process the data;
   evaluating, by the data processing arrangement, the obtained data to perform a translation to target velocities ($v_{road}$) for the respective control points (P);
   performing, by the data processing arrangement, for each respective control point ($P_n$, $P_{n+1}$, etc.) a translation from target velocity ($v_{road, n}$, $v_{road, n+1}$, etc.) for that control point ($P_n$, $P_{n+1}$, etc.) and distance ($d_n$, $d_{n+1}$, etc.) to that control point ($P_n$, $P_{n+1}$, etc.) and obtained current ego velocity ($v_E$) of the road vehicle, to a target acceleration ($a_n$, $a_{n+1}$, etc.) to reach that control point ($P_n$, $P_{n+1}$, etc.) at the target velocity ($v_{road, n}$, $v_{road, n+1}$, etc.) for that control point ($P_n$, $P_{n+1}$, etc.);
   continuously streaming the resulting target accelerations ($a_n$, $a_{n+1}$, etc.) for the respective control points ($P_n$, $P_{n+1}$, etc.) to a control unit of the road vehicle; and
   adjusting, by the control unit, the road vehicle acceleration to reach each respective control point ($P_n$, $P_{n+1}$, etc.) at the target velocity ($v_{road, n}$, $v_{road, n+1}$, etc.) for that control point ($P_n$, $P_{n+1}$, etc.).

2. A method according to claim 1, wherein it further comprises obtaining said curvature value (r) data from at least one of: a map system; an onboard camera system; one or more onboard yaw-rate sensors; one or more onboard radar sensors; one or more onboard lidar sensors.

3. A method according to claim 1, wherein it further comprises obtaining said road property data that include at least one of: road width; slope; inclination; lane width; road type; banking; and number of lanes.

4. A method according to claim 1, wherein it further comprises obtaining said environmental property data including at least one of data on: sight distance; light conditions; road edge; lateral clearance distance; and weather conditions.

5. A method according to claim 1, wherein it further comprises obtaining said driver property data including at least one of data on: individual preferences; and driving style.

6. A method according to claim 1, wherein it further comprises determining curve exits through fusing, by the data processing arrangement, two or more of: map data from the map system; yaw-rate data from the one or more onboard yaw-rate sensors; data from one or more onboard camera sensors; data from one or more onboard radar sensors; data from one or more onboard lidar sensors.

7. A method according to claim 1, wherein it further comprises providing an override of functionality on per-curve basis by depressing at least one of an accelerator pedal, a brake pedal or a clutch pedal of the road vehicle.

8. A method according to claim 1 wherein it further comprises selecting the target acceleration ($a_{n+1}$) for a respective control point ($P_{n+1}$) as a minimum acceleration required, from a previous control point ($P_n$), to reach that control point ($P_{n+1}$) at the target velocity ($v_{road, n+1}$) for that control point ($P_{n+1}$).

9. A method according to claim 1, wherein it further comprises performing the translation to target velocities ($v_{road}$) for the respective control points (P) using one of a polynomial or table lookup function.

10. A road vehicle continuous curve speed adjustment apparatus, comprising:
    a vechicle speedometer for obtaining current ego velocity ($v_E$) data of the road vehicle;
    one or more of: a map system, an onboard camera system, an onboard yaw-rate sensor, an onboard radar sensor, and an onboard lidar sensor for obtaining distance (d) and curvature value (r) data of an upcoming road segment represented by a set of control points ($P_n$, $P_{n+1}$, etc.) to be negotiated by the road vehicle;
    one or more of: the onboard camera system, the map system, the onboard lidar sensor, and an onboard radar system for obtaining road property data of a road comprising the road segment to be negotiated;
    one or more of: an onboard vehicle sensor and online weather service for obtaining environmental property data of the road vehicle environ;
    one or more of: a human-machine-interface and the onboard sensor for obtaining driver property data of the road vehicle driver;
    one or more communication arrangements for transmission/reception of wired, or wireless communication for continuously streaming the obtained data to a data processing arrangement arranged to process the data;
    the data processing arrangement being arranged to:
    evaluate the obtained data to perform a translation to target velocities ($v_{road}$) for the respective control points (P); and to perform, for each respective control point ($P_n$, $P_{n+1}$, etc.), a translation from target velocity ($v_{road, n}$, $v_{road, n+1}$, etc.) for that control point ($P_n$, $P_{n+1}$, etc.) and distance ($d_n$, $d_{n+1}$, etc.) to that control point ($P_n$, $P_{n+1}$, etc.) and obtained current ego velocity ($v_E$) of the road vehicle (1), to a target acceleration ($a_n$, $a_{n+1}$, etc.) to reach that control point ($P_n$, $P_{n+1}$, etc.) at the target velocity ($v_{road, n}$, $v_{road, n+1}$, etc.) for that control point ($P_n$, $P_{n+1}$, etc.);
    the apparatus further comprising:
    one or more communication arrangements for transmission/reception of wired, or wireless communication for continuously streaming the resulting target accelerations ($a_n$, $a_{n+1}$, etc.) for the respective control points ($P_n$, $P_{n+1}$, etc.) to a control unit of the road vehicle; the control unit being arranged to adjust the road vehicle (1) acceleration to reach each respective control point ($P_n$, $P_{n+1}$, etc.) at the target velocity ($v_{road, n}$, $v_{road, n+1}$, etc.) for that control point ($P_n$, $P_{n+1}$, etc.).

* * * * *